(12) United States Patent
Chen

(10) Patent No.: US 6,979,013 B2
(45) Date of Patent: Dec. 27, 2005

(54) BICYCLE FOLDABLE TO ALIGN FRONT AND REAR WHEELS ALONG A TRANSVERSE DIRECTION OF THE BICYCLE

(75) Inventor: Ming-Chang Chen, Taichung Hsien (TW)

(73) Assignee: Giant Manufacturing Co., Inc. (TW)

( * ) Notice: Subject to any disclaimer, the term of this patent is extended or adjusted under 35 U.S.C. 154(b) by 124 days.

(21) Appl. No.: 10/668,243

(22) Filed: Sep. 24, 2003

(65) Prior Publication Data

US 2005/0062256 A1 Mar. 24, 2005

(51) Int. Cl.$^7$ .............................................. B62K 15/00
(52) U.S. Cl. ..................................... 280/287; 280/278
(58) Field of Search .................................. 280/278, 287

(56) References Cited

U.S. PATENT DOCUMENTS

| | | | | |
|---|---|---|---|---|
| 4,296,940 A | * | 10/1981 | Herbert | 280/278 |
| 4,460,191 A | * | 7/1984 | Ishibashi et al. | 280/287 |
| 4,460,192 A | * | 7/1984 | Takamiya et al. | 280/287 |
| 4,491,337 A | * | 1/1985 | Zuck | 280/278 |
| 4,844,494 A | * | 7/1989 | Blanchard | 280/278 |
| 5,069,468 A | * | 12/1991 | Tsai et al. | 280/278 |
| 5,205,573 A | * | 4/1993 | Mhedhbi | 280/287 |
| 6,032,971 A | * | 3/2000 | Herder | 280/278 |
| 6,279,935 B1 | * | 8/2001 | Wagner | 280/287 |
| 6,595,539 B1 | * | 7/2003 | Belli | 280/287 |

* cited by examiner

Primary Examiner—Lesley D. Morris
Assistant Examiner—L. Lum
(74) Attorney, Agent, or Firm—Harness, Dickey & Pierce, P.L.C.

(57) ABSTRACT

A foldable bicycle includes a front wheel, a rear wheel, and a frame assembly that interconnects the front and rear wheels and that has a plurality of elements, which are interconnected by means of a plurality of horizontal pivot pins. Each of the pivot pins is inclined relative to a transverse direction of the bicycle. As such, the bicycle frame can be folded to align the front and rear wheels along a transverse direction of the bicycle.

6 Claims, 8 Drawing Sheets

BICYCLE FOLDABLE TO ALIGN FRONT AND REAR WHEELS ALONG A TRANSVERSE DIRECTION OF THE BICYCLE

BACKGROUND OF THE INVENTION

1. Field of the Invention

This invention relates to a bicycle, and more particularly to a foldable bicycle, which is foldable along a substantially longitudinal direction of the bicycle such that front and rear wheels of the bicycle are aligned along a transverse direction of the bicycle.

2. Description of the Related Art

A conventional foldable bicycle can be folded along a substantially longitudinal direction of the bicycle. However, it is necessary to remove one of front and rear wheels of the conventional foldable bicycle prior to folding of the bicycle. Furthermore, it is difficult to mount a shock absorber on the frame of the conventional foldable bicycle.

SUMMARY OF THE INVENTION

An object of this invention is to provide a foldable bicycle that can be folded along a substantially longitudinal direction of the bicycle without the need to remove either of front and rear wheels prior to folding of the bicycle.

Another object of this invention is to provide a foldable bicycle that can folded along a substantially longitudinal direction of the bicycle and that includes a shock absorber, which is mounted on a frame.

According to this invention, a foldable bicycle includes a front wheel, a rear wheel, and a frame assembly that interconnects the front and rear wheels and that has a plurality of elements, which are interconnected by means of a plurality of horizontal pivot pins. Each of the pivot pins is inclined relative to a transverse direction of the bicycle. As such, the bicycle frame can be folded to align the front and rear wheels along a transverse direction of the bicycle. Preferably, the frame assembly has a front frame unit and a rear frame unit that are interconnected pivotally at lower portions thereof and that are interconnected at upper portions thereof by means of a damping hydraulic cylinder, which serves as a shock absorber and which is removed from the front frame unit prior to folding of the bicycle.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
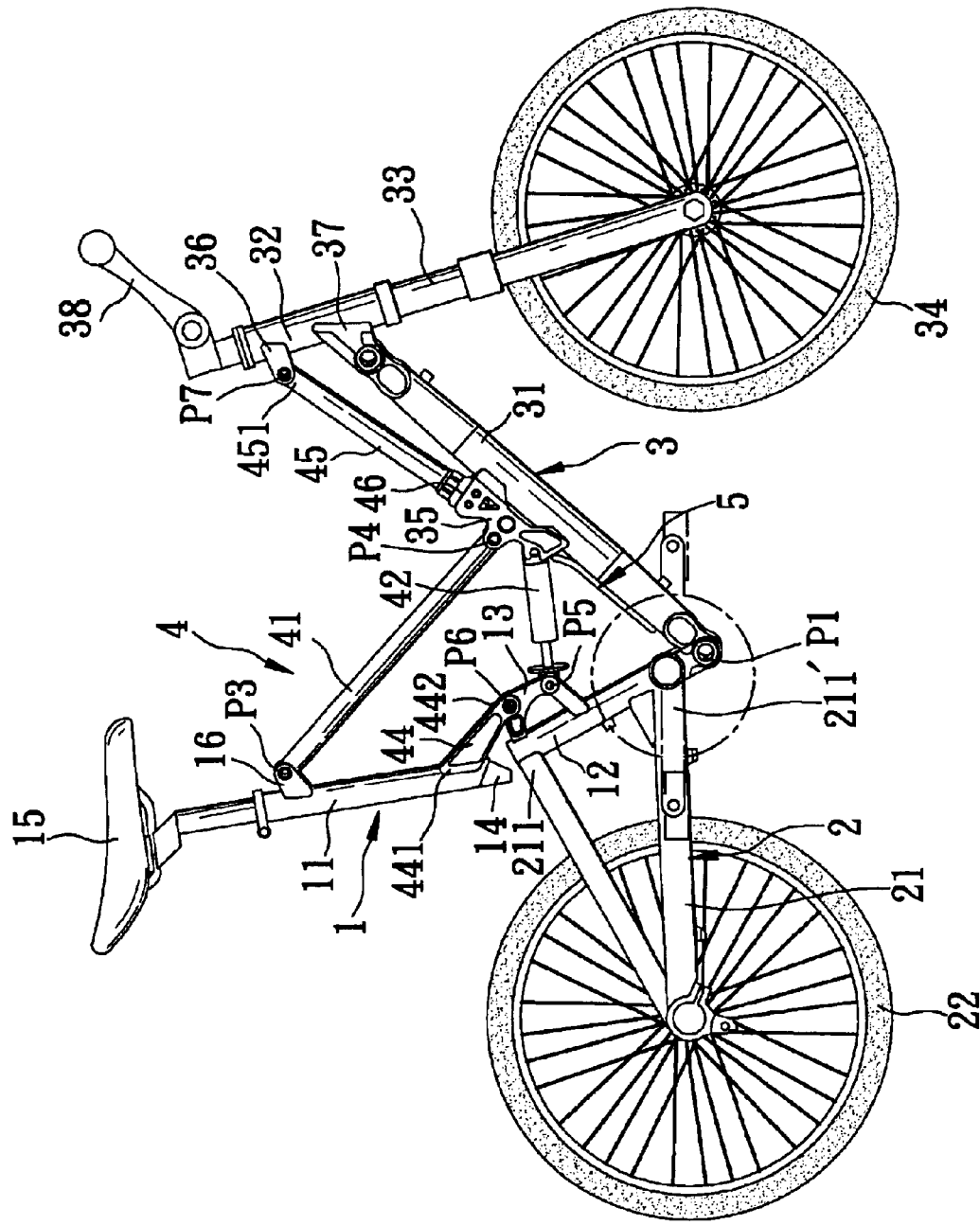
FIG. 1 is a side view of the preferred embodiment of a foldable bicycle according to this invention.
Figure 2:
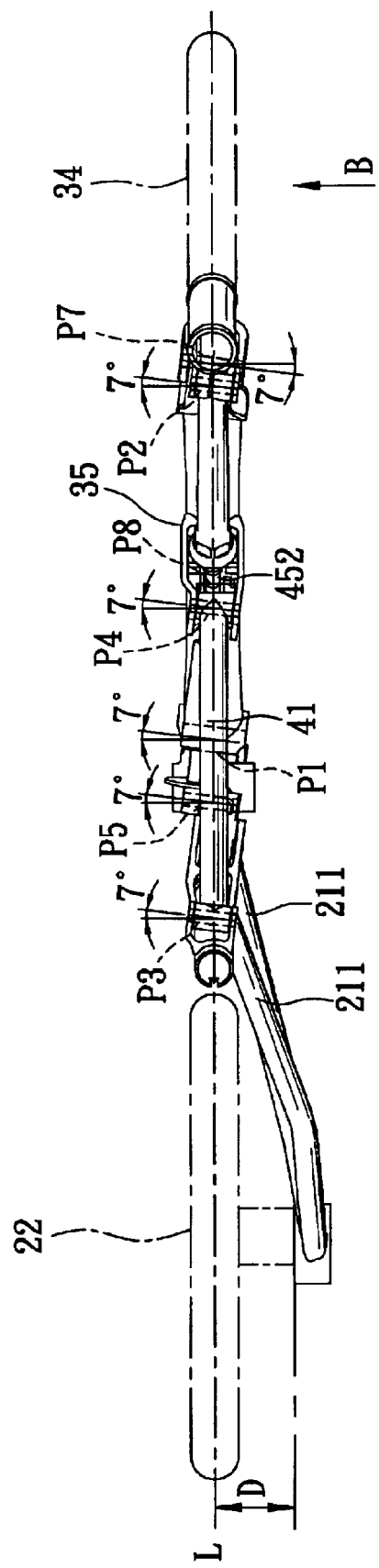
FIG. 2 is a top view of the preferred embodiment.

Referring to FIGS. 1 and 2, the preferred embodiment of a foldable bicycle according to this invention is shown to have a front wheel 34, a rear wheel 22, and a frame assembly that includes a seat rod unit 1, a rear frame unit 2, a front frame unit 3, and a link unit 4.

The seat rod unit 1 includes an upper seat rod 11, a lower seat rod 12 located below the upper seat rod 11, a lug 13 connected fixedly to and disposed in front of the lower seat rod 12, a leg element 14 connected fixedly to and extending downwardly from a lower end of the upper seat rod 11, a saddle 15 connected to an upper end of the upper seat rod 11, and two aligned lugs 16 connected fixedly and extending frontwardly from the upper seat rod 11.

The rear frame unit 2 includes a V-shaped rear fork rod 21 that has a rear end, on which the rear wheel 22 is mounted rotatably. The rear fork rod 21 has an inclined upper rod portion 211 and a horizontal lower rod portion 211' that have front ends which are connected fixedly to the lower seat rod 12. Rear ends of the upper rod portion 211 and the horizontal lower rod portion 211' are spaced apart from a center plane (L) of the frame assembly by a distance (D), as shown in FIG. 2. A front sprocket (shown by phantom lines in FIGS. 1, 5, 6, and 7), a rear sprocket (not shown), and an endless chain (not shown) are provided on the bicycle in a known manner.

Figure 3:
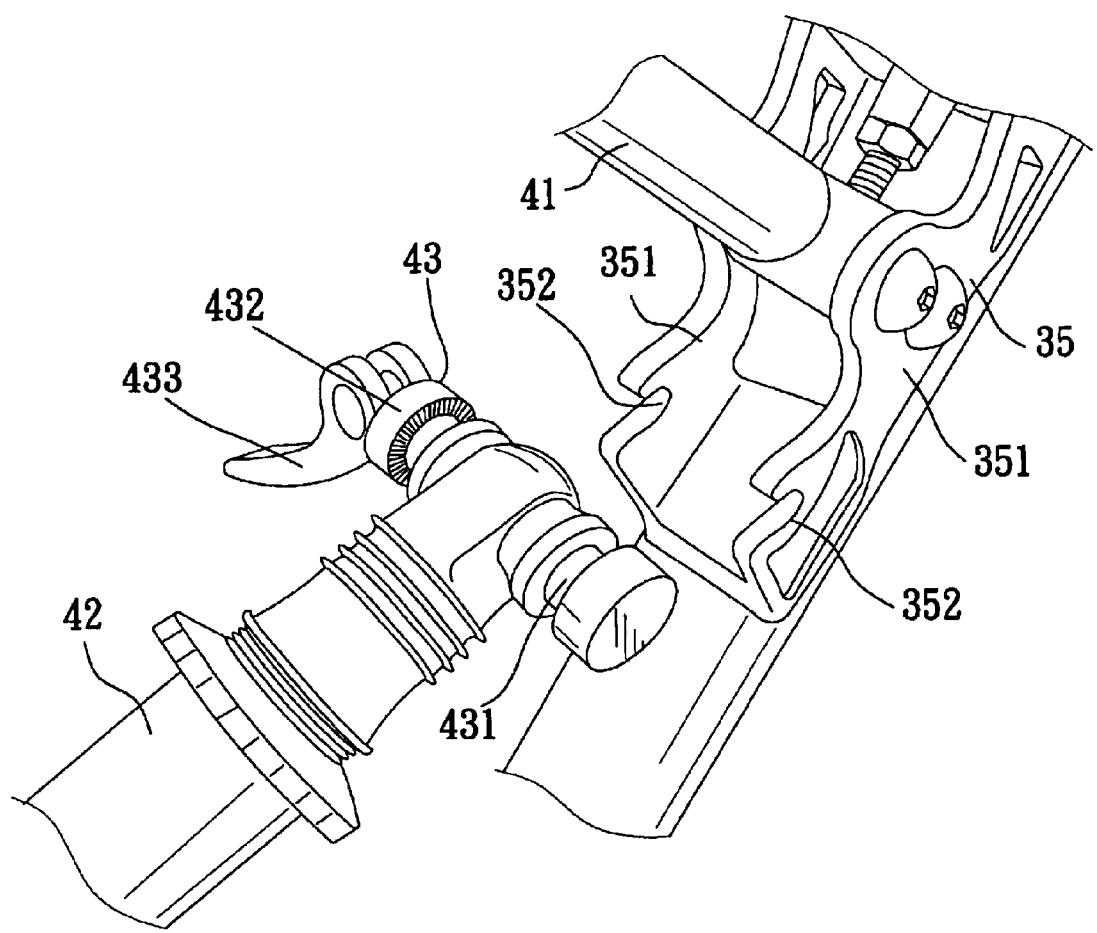
FIG. 3 is a fragmentary exploded perspective view of the preferred embodiment, illustrating how a quick-release clamp is provided between a damping hydraulic cylinder and a connector.
Figure 4:
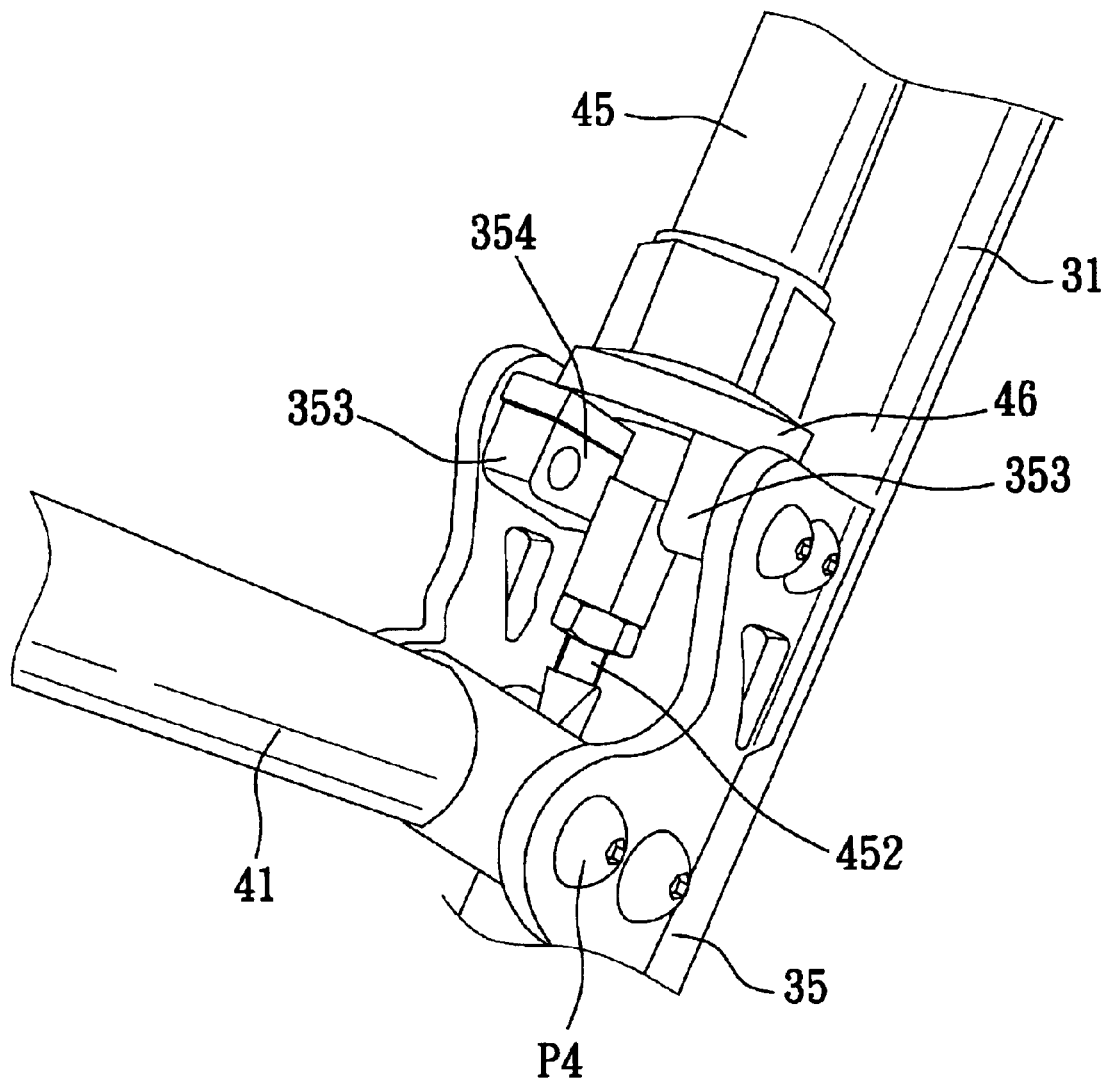
FIG. 4 is a fragmentary perspective view of the preferred embodiment, illustrating how inclined front and rear connecting rods are interconnected.

The front frame unit 3 includes an inclined front frame rod 31 extending frontwardly and upwardly from a lower end of the lower seat rod 12, a head tube 32, a front fork rod 33 for mounting the front wheel 34, a connector 35, an upper lug 36 connected fixedly to an upper portion of the head tube 32, and a lower lug 37 connected fixedly to a lower portion of the head tube 32. The front frame rod 31 has a lower end connected rotatably to a lower end of the lower seat rod 12 by a horizontal first pivot pin (P1) such that an assembly of the lower seat rod 12 and the front frame rod 31 is V-shaped, and an upper end connected pivotally to the lower lug 37 by a horizontal second pivot pin (P2). The front fork rod 33 extends through the head tube 32, and has an upper end that is formed with a handle 38. Referring to FIGS. 1, 3, and 4, the connector 35 is disposed fixedly on the front frame rod 31, and has two aligned lugs 351, two aligned notches 352 formed respectively in the lugs 351, two aligned stop elements 353 connected respectively and fixedly to and disposed between the lugs 351, and a passage 354 defined between the stop elements 353.

Figure 4A:
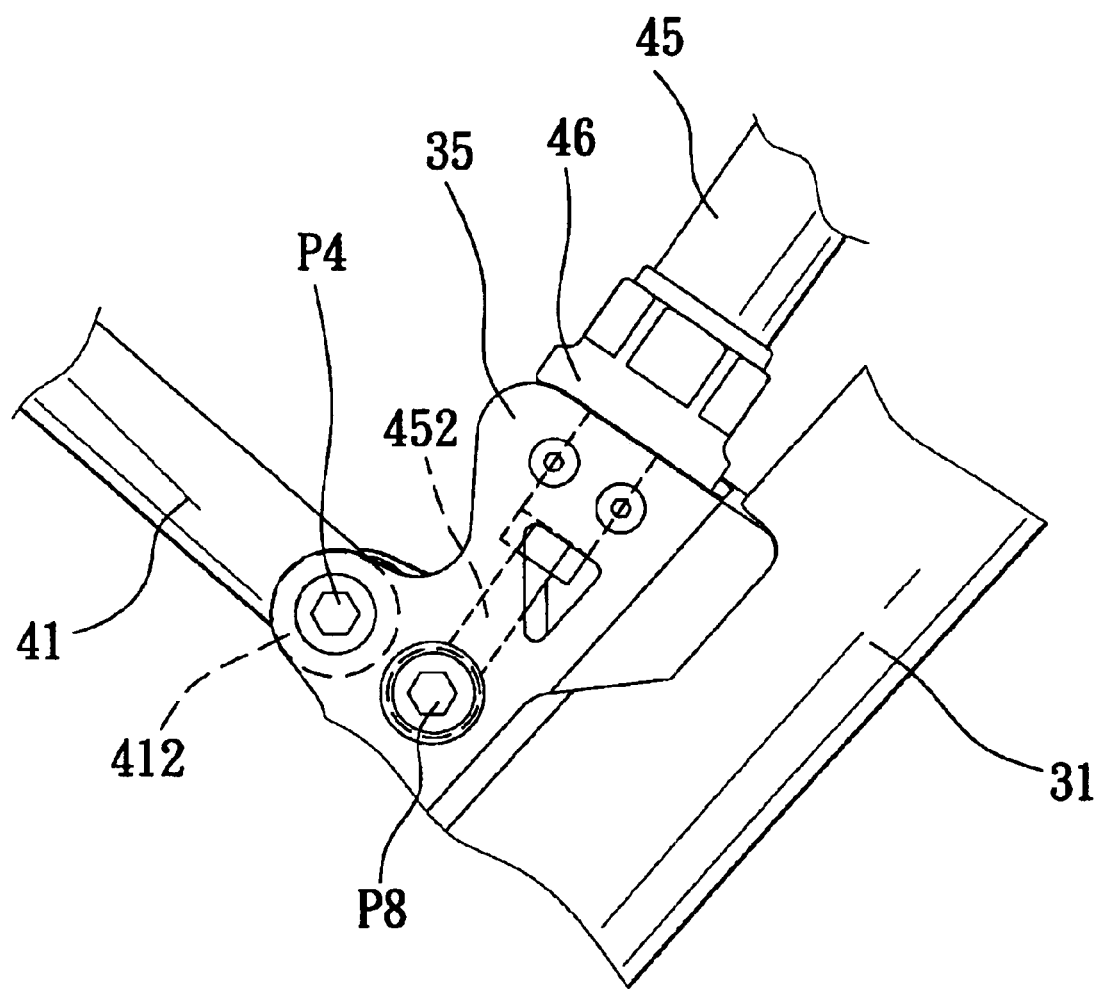
FIG. 4A is a fragmentary side view of the preferred embodiment, illustrating how the front and rear connecting rods are interconnected.

The link unit 4 includes a rearwardly and upwardly inclined rear connecting rod 41, a damping hydraulic cylinder 42, a quick-release clamp 43, an inclined tongue 44, an inclined front connecting rod 45, and an outward flange 46. The rear connecting rod 41 extends frontwardly and downwardly from the lugs 16, and has a rear end connected to the lugs 16 by a horizontal third pivot pin (P3), a front distal end 411 (see FIG. 4A), and a front end portion 412 (see FIG. 4A) that is disposed between the rear end and the front distal end 411 of the rear connecting rod 41 and adjacent to the front distal end 411 (see FIG. 4A) of the rear connecting rod 41 and that is connected rotatably to the connector 35 by a horizontal fourth pivot pin (P4). The hydraulic cylinder 42 is generally horizontal, and is connected rotatably to the lug 13 by a horizontal lower pivot pin (P5). The tongue 44 extends frontwardly and downwardly from the lower end of the upper seat rod 11, and has a first end 441 connected fixedly to the upper seat rod 11, and a second end 442 connected rotatably to the lug 13 by a horizontal upper pivot pin (P6). The quick-release clamp 43 is attached to a front end of the hydraulic cylinder 42, and includes an insert rod 431 inserted into the notches 352 in the lugs 351 at two ends of the insert rod 431, a pressing element 432, and a cam lever 433. The cam lever 433 is rotatable in a direction to press the pressing element 432 against the corresponding lug 351 in a known manner so as to lock the hydraulic cylinder 42 on the connector 35, thereby positioning the front fork rod 31 relative to the lower seat rod 12. The hydraulic cylinder 42 and the quick-release clamp 43 constitute cooperatively a locking device. The quick-release clamp 43 can be removed from the connector 35 by rotating the cam lever 433 in the opposite direction. Because the front frame rod 31 is connected pivotally to the lower seat rod 12, the hydraulic cylinder 42 serves as a shock absorber. The front connecting rod 45 extends rearwardly and downwardly from the upper lug 36, and has a front end 451 connected rotatably to the upper lug 36 by a horizontal front pivot pin (P7), and a rear end 452 extending through the passage 354 and connected rotatably to the front distal end 411 of the rear connecting rod 41 by a horizontal rear pivot pin (P8) (see FIG. 4A), as shown in FIGS. 4 and 4A. The outward flange 46 is formed on the rear end 452 of the front connecting rod 45, and abuts against the stop elements 353 so that an angle formed between the front and rear connecting rods 45, 41 is fixed.

A retaining belt 5 has two ends that are fastened respectively to the front frame rod 31 and the front end of the hydraulic cylinder 42.

The front and rear wheels 34, 22 are aligned along a longitudinal direction of the bicycle, as shown in FIG. 2.

Figure 5:
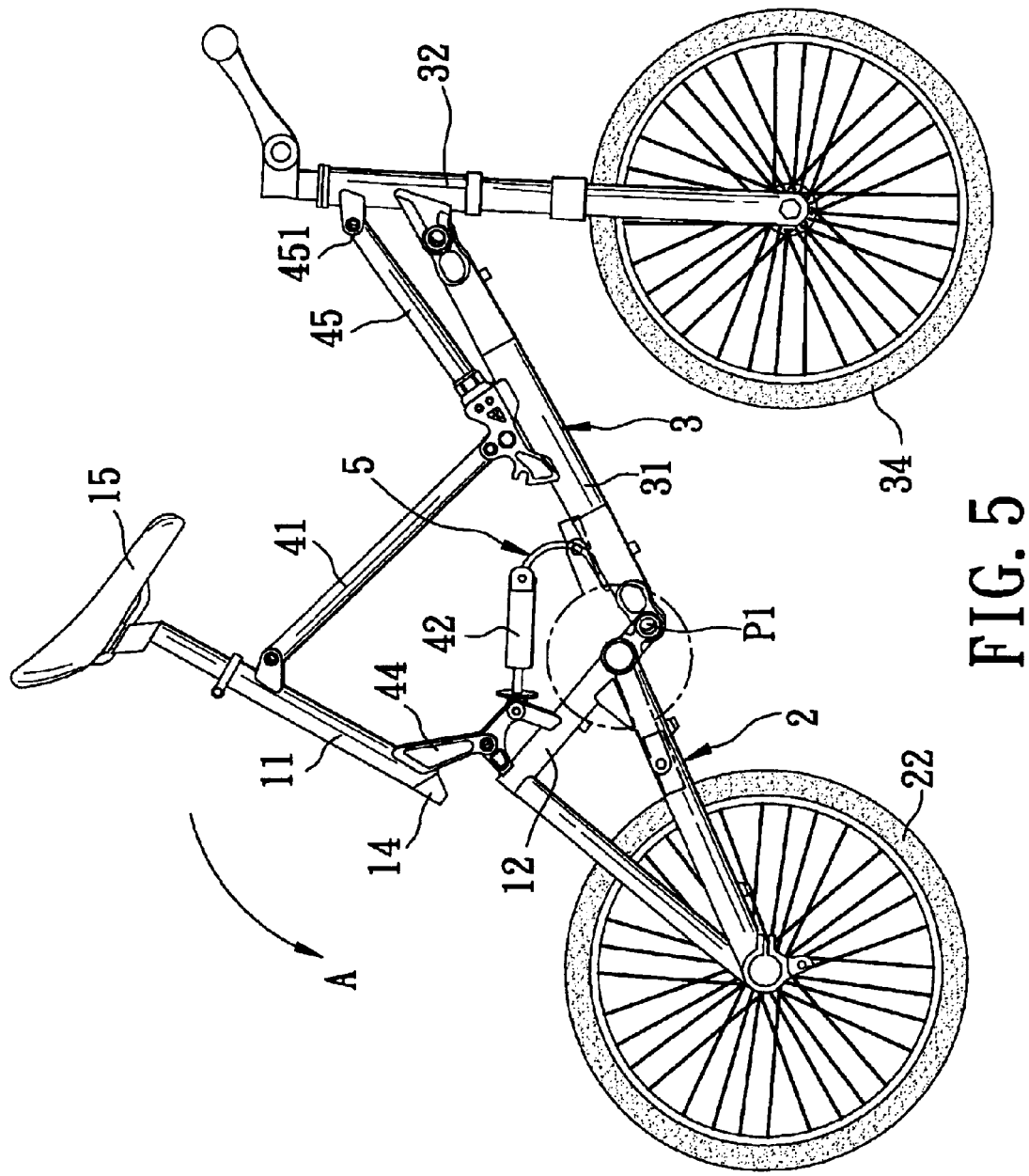
FIGS. 5, 6, and 7 are side views of the preferred embodiment, illustrating how the bicycle is folded.
Figure 6:
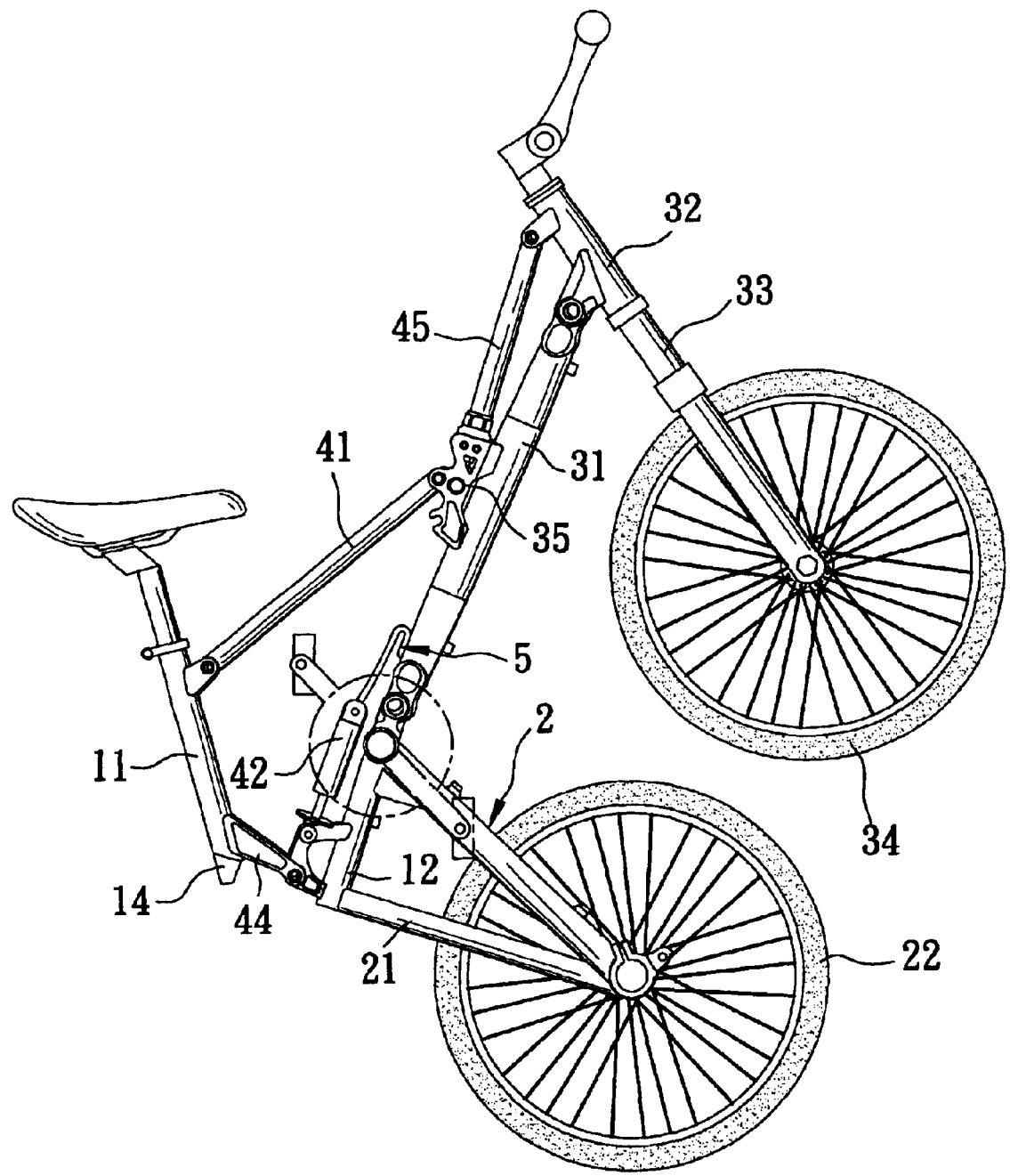
Figure 7:
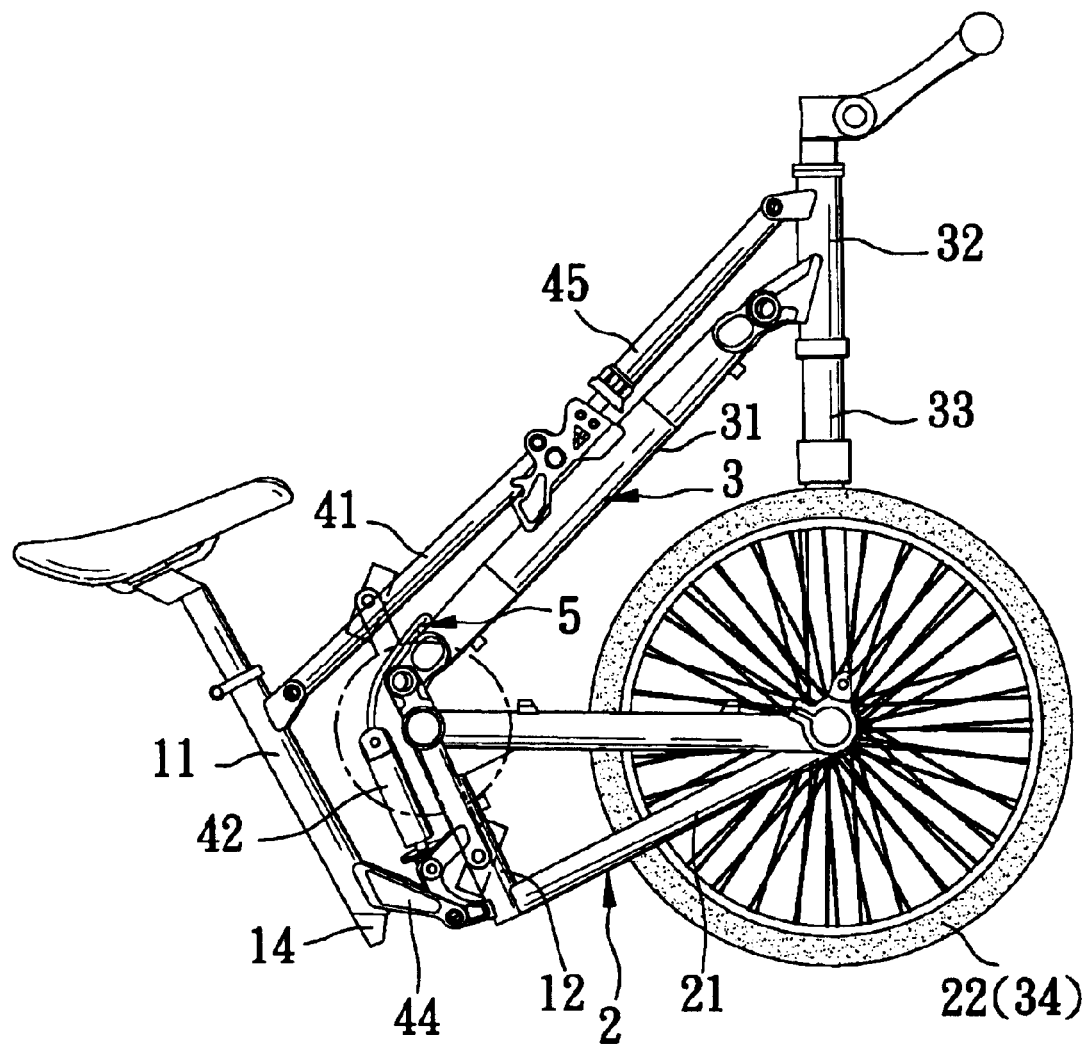

When it is desired to fold the bicycle, the cam lever 433 of the quick-release clamp 43 is rotated to remove the hydraulic cylinder 42 from the connector 35. Subsequently, the handle 38 of the front fork rod 33 is held using one hand. The saddle 15 is held using the other hand, and is turned rearward away from the handle 38 about the first pivot pin (P1) in a direction (A) (see FIG. 5) to move the rear wheel 22 toward the front wheel 34, as shown in FIGS. 5 and 6. Because an inclination angle of 7° is formed between a transverse direction (B) of the bicycle and each of the first, second, third, fourth, lower, and front pivot pins (P1, P2, P3, P4, P5, P7), as shown in FIG. 2, when the saddle 15 is turned in the direction (A) relative to the handle 38, the rear wheel 22 deflects gradually from the front wheel 34. As such, the saddle 15 can be turned to a completely folded position shown in FIG. 7, where the front and rear wheels 34, 22 are aligned along the transverse direction (B) (see FIG. 2) of the bicycle and where the leg element 14 and the front and rear wheels 34, 22 can be placed on the ground. As such, the completely folded bicycle can stand on the ground, thereby facilitating storage and transportation of the bicycle.

Preferably, the inclination angle of each of the first, second, third, fourth, lower, and front pivot pins (P1, P2, P3, P4, P5, P7) is between 7° and 12°.

With this invention thus explained, it is apparent that numerous modifications and variations can be made without departing from the scope and spirit of this invention. It is therefore intended that this invention be limited only as indicated by the appended claims.

I claim:

1. A foldable bicycle comprising:
   a seat rod unit including a saddle, an upper seat rod connected fixedly to said saddle and having a lower end, and a lower seat rod that is located below said upper seat rod, that is connected pivotally to said lower end of said upper seat rod, and that has a lower end;
   a rear fork rod connected fixedly to said lower seat rod;
   a rear wheel mounted rotatably on said rear fork rod;
   a front frame unit including a head tube, a front fork rod extending through said head tube, a handle connected to and disposed above said head tube, a frontwardly and upwardly inclined front frame rod having an upper end and a lower end, a horizontal first pivot pin extending through said lower ends of said lower seat rod and said front frame rod such that an assembly of said lower seat rod and said front frame rod is V-shaped, and a horizontal second pivot pin for connecting said front frame rod rotatably to said head tube;
   a front wheel mounted rotatably on said front fork rod and aligned with said rear wheel along a longitudinal direction of said bicycle; and
   a link unit including
   a rearwardly and upwardly inclined rear connecting rod disposed between said upper seat rod and said front frame rod and having a front distal end, a rear end, and a front end portion that is disposed between said rear end and said front distal end of said rear connecting rod and that is disposed adjacent to said front distal end of said rear connecting rod,
   a horizontal third pivot pin for connecting said rear end of said rear connecting rod rotatably to said upper seat rod,
   a horizontal fourth pivot pin for connecting said front end portion of said rear connecting rod rotatably to said front frame rod,
   a locking device for locking said front frame rod releasably relative to said lower seat rod,
   a frontwardly and upwardly inclined front connecting rod disposed between said head tube and said front frame rod and having a front end and a rear end,
   a front pivot pin for connecting said front end of said front connecting rod rotatably to said head tube, and
   a rear pivot pin for connecting said rear end of said front connecting rod rotatably to said front distal end of said rear connecting rod, each of said first, second, third, fourth, and front pivot pins forming an inclination angle with respect to a transverse direction of said bicycle so that, when said saddle is turned rearwardly away from said handle to a completely folded position, said front and rear wheels are aligned along said transverse direction of said bicycle.

2. The foldable bicycle as claimed in claim 1, wherein said inclination angle is between 7° and 12°.

3. The foldable bicycle as claimed in claim 1, wherein said link unit further includes a generally horizontal damping hydraulic cylinder connected removably to said front frame rod, and a horizontal lower pivot pin for connecting said hydraulic cylinder rotatably to said lower seat rod so that said hydraulic cylinder serves as a shock absorber.

4. The foldable bicycle as claimed in claim 3, wherein said link unit further includes a quick-release clamp that locks said hydraulic cylinder releasably on said front frame rod and that includes a cam lever that is rotatable in a direction so as to release said hydraulic cylinder from said front frame rod, said hydraulic cylinder and said quick-release clamp constituting cooperatively said locking device.

5. The foldable bicycle as claimed in claim 1, wherein said quick-release clamp further includes an insert rod; said front frame unit further includes a connector that is disposed fixedly on said front frame rod and that has two aligned lugs, two aligned notches formed respectively in said lugs, two aligned stop elements connected respectively and fixedly to and disposed between said lugs, and a passage defined between said stop elements;

said front connecting rod has a rear end extending through said passage and connected pivotally to said rear connecting rod; and said front frame unit further includes an outward flange that is formed on said rear end of said front connecting rod and that abuts against said stop elements so that an angle formed between said front and rear connecting rods is fixed.

6. The foldable bicycle as claimed in claim 1, wherein said link unit further includes an inclined tongue connected fixedly to and extending frontwardly and downwardly from said lower end of said upper seat rod, said seat rod unit further including a lug connected fixedly to and disposed in front of said lower seat rod and connected pivotally to said tongue, and a leg element connected fixedly to and extending downwardly from said lower end of said upper seat rod, said leg element and said front and rear wheels being adapted to be placed on the ground when said bicycle is folded completely so that said bicycle can stand on the ground.

* * * * *